United States Patent
Wack et al.

(10) Patent No.: US 6,695,109 B2
(45) Date of Patent: Feb. 24, 2004

(54) TORSIONAL VIBRATION DAMPER FOR A HYDRODYNAMIC TORQUE CONVERTER

(75) Inventors: Erwin Wack, Niederwerrn (DE); Christoph Sasse, Schweinfurt (DE); Horst Breier, Dittelbrunn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/139,589

(22) Filed: May 3, 2002

(65) Prior Publication Data

US 2002/0175037 A1 Nov. 28, 2002

(30) Foreign Application Priority Data

May 25, 2001 (DE) .......................... 101 25 438

(51) Int. Cl.[7] .............................................. F16D 45/02
(52) U.S. Cl. ...................... 192/3.29; 192/212
(58) Field of Search ................. 192/3.29, 212, 192/112, 3.28, 3.3, 206

(56) References Cited

U.S. PATENT DOCUMENTS

| | | | |
|---|---|---|---|
| 4,577,737 A | * 3/1986 | Niikura et al. | 477/168 |
| 5,752,894 A | * 5/1998 | Fischer | 477/169 |
| 6,056,092 A | * 5/2000 | Hinkel | 192/3.29 |
| 6,068,096 A | * 5/2000 | Morita | 192/3.29 |
| 6,070,704 A | * 6/2000 | Sasse | 192/3.28 |
| 6,273,226 B1 | 8/2001 | Hönemann et al. | 192/3.29 |

FOREIGN PATENT DOCUMENTS

| | | | |
|---|---|---|---|
| DE | 44 23 640 | 6/1995 | ........... F16H/45/02 |
| DE | 197 55 168 | 6/1999 | ........... F16H/41/24 |
| DE | 199 63 236 | 7/2000 | ........... F16H/45/02 |

* cited by examiner

Primary Examiner—Saul Rodriquez
(74) Attorney, Agent, or Firm—Cohen, Pontani, Lieberman & Pavane

(57) ABSTRACT

A torsional vibration damper for a hydrodynamic torque converter is provided with at least one input part and an output part, which is given the ability to move relative to the input part by stored-energy elements, where the output part is designed as a hub disk, which is connected nonrotatably to a hub centered on a transmission input shaft. The hub disk extends radially inward to the area of the outside circumference of the hub, where it is connected directly to the hub.

15 Claims, 1 Drawing Sheet

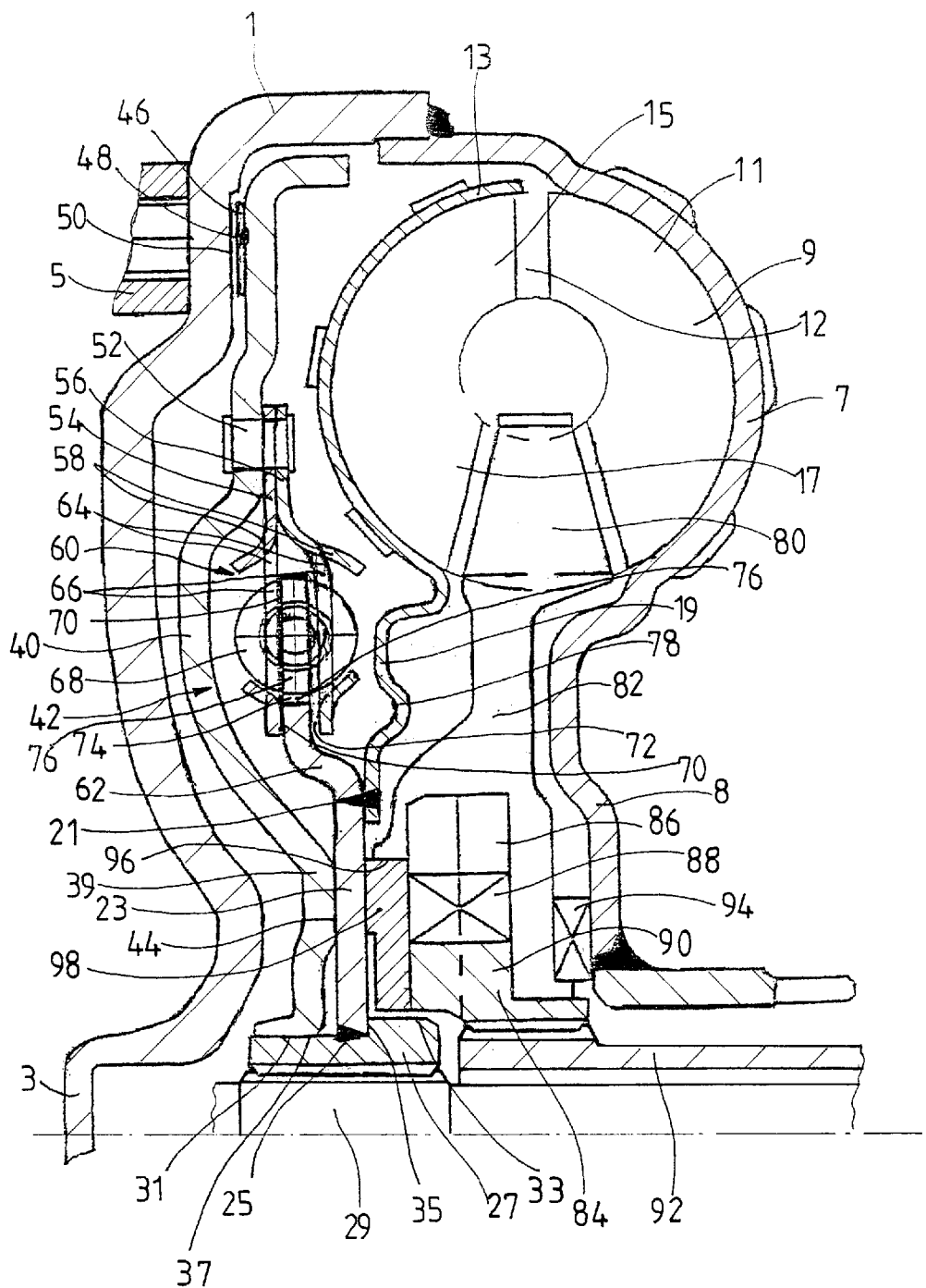

TORSIONAL VIBRATION DAMPER FOR A HYDRODYNAMIC TORQUE CONVERTER

BACKGROUND OF THE INVENTION

1. Field of the Invention

The invention pertains to a torsional vibration damper for a hydrodynamic torque converter, the damper having an input section including a converter cover and an output section including a hub disk which is non-rotatably connected to a hub which can be centered on a transmission shaft. A bridge clutch includes a piston connected to said hub disk via stored energy elements which permit relative movement. The piston can be brought into working connection with the converter cover by means of at least one friction surface.

2. Description of the Related Art

U.S. Pat. No. 6,273,226 discloses torsional vibration damper for a hydrodynamic torque converter which works together with a bridge clutch equipped with a piston. Cover plates, which act as the input section of the torsional vibration damper, are attached to the piston of this bridge clutch, and each of these plates has circumferential openings, which hold stored-energy elements. These devices can be operated by actuating areas on the cover plates. The stored-energy elements are supported at the other end by a hub disk, the radially outer area of which is provided with radial projections. The hub disk serves as the output section of the torsional vibration damper. The radial projections project into the axial area between the two cover plates and include actuating areas for the stored-energy elements.

The radially inner end of the hub disk, according to FIG. 1 of the patent, is nonrotatably connected by gear teeth to a hub, which also has a radially outward-projecting hub flange, so that it can be connected to the base of the turbine wheel of the hydrodynamic torque converter, this connection being accomplished by means of rivets. On the transmission side, the hub is braced by an axial support on the hub of the stator of the hydrodynamic torque converter. The other end of the stator is supported by another axial support on a converter hub on the transmission side.

The previously mentioned hub is referred to in technical circles as a "turbine hub", which, because of its complicated geometric design with areas of different thickness, can be produced as a forging, as a casting, or as a sintered part. Because these types of production methods do not lead to surface qualities or dimensional accuracies which are sufficient to meet the requirements imposed on turbine hubs, it is usually necessary to subject the workpieces to a machining process such as turning to achieve the required surface quality and the desired narrow tolerances. If the turbine hub is produced by a casting operation, problems involving strength and the porosity of the surface must also be dealt with, whereas production by means of a sintering process makes it necessary to accept higher production costs and welding problems, again because of high porosity.

Another disadvantage of the design of the hydrodynamic torque converter described in FIG. 1 of the above-cited patent is the expense associated with the use of rivets to connect the turbine base to the radial flange of the turbine hub, because measures must be taken to ensure proper centering, and openings must be provided for the rivets. In addition, the axial support which braces the turbine hub in the direction toward the stator is not centered and thus lacks accurate guidance. It should also be pointed out that, when the piston of the bridge clutch executes movements in the axial direction, the entire torsional vibration damper must be moved along with it, which increases both inertia and wear. The torsional vibration damper is therefore connected to the turbine hub by means of a set of gear teeth, so that it can perform this type of axial movement.

Although the last-mentioned problem is not present when the hub disk of the torsional vibration damper is connected to the turbine hub by peening as shown in FIG. 6, it can nevertheless be seen in conjunction with FIG. 7 that this advantage is purchased at the cost of even greater production and joining work.

SUMMARY OF THE INVENTION

The invention is based on the task of designing a torsional vibration damper for a hydrodynamic torque converter in such a way that, first, both high strength and dimensional accuracy are obtained at the least possible production cost and, second, that these advantages can be obtained with the use of a minimum amount of material.

According to the invention, the hub disk extends radially inward to the outside circumference of the hub, where it is attached directly to the hub.

Because the hub disk is extended radially inward to the area of the outside circumference of the hub and is attached directly to the hub at that point, it is possible to do without a "turbine hub" entirely. Instead, a hub of very simple design can be used, which, if desired, can be completely free of radial projections; and because the hub disk of the torsional vibration damper extends directly up to the hub, it is even possible to omit a hub flange as well. As a result of this constructive design, the hub, as far as its function is concerned, becomes a "torsional vibration damper hub" and thus offers the best possible design for a torsional vibration damper with an output part which is to be brought directly into rotational connection with the transmission output shaft. A torsional vibration damper of this type is referred to in technical circles as a "turbine damper".

Aside from the previously mentioned functional advantage of the object according to the invention, there are also special advantages to be obtained with respect to production technology, which are reflected in very favorable production costs. Thus the hub disk can be produced from standard commercial sheets or plates by simple stamping, possibly combined with a light drawing operation; the stamping operation can be performed with such precision that no problems with dimensional accuracy are encountered. The choice of sheets or plates obviously also ensures that the hub disk will have the required smooth surface and will be easy to weld. This latter feature is especially important, because it means that the hub disk can be permanently connected to the other components in a technically simple, precise, and low-cost manner. Thus the performance of a welding operation to join the hub disk to the hub is advantageous, and, of course, the hub itself should also be made of a material which allows optimal welding. It is easy to make an appropriate choice of material for the hub, because it is of very simple design and can thus be produced by cold forming, preferably by cold pressing. This pressing operation can be accomplished in a single pass through a line of presses or possibly even on a single press. It is well known that, when cold forming of this type is used, the dimensional accuracy and the surface condition are of such high quality that no subsequent machining operations are required.

It is also advantageous to attach the base of the turbine wheel of the hydrodynamic torque converter to the hub disk by welding. As a result, it is possible to omit entirely the turbine hub normally used in hydrodynamic torque converters. Thus, thanks to the way in which the hub disk according to the invention is designed and to the way in which it is connected both to the hub and to the turbine base, an overall configuration is achieved which is characterized by the minimal use of material. In addition to the advantages previously described, the overall power takeoff side of the hydrodynamic torque converter also has an especially lightweight and thus low-inertia design.

In regard to the previously mentioned welds between the hub disk and the hub and between the hub disk and the turbine base, it should be pointed out that all of the knowledge concerning welding on hydrodynamic torque converters such as that conveyed in DE 197 55 168, should be applied here. In particular, the laser welding method can be considered especially advantageous for making the present connections.

Because the hub is designed with an axial contact surface for the hub disk, furthermore, the hub disk is fixed axially in position with respect to the hub in addition to being centered radially, as already provided in any case, so that, especially when this axial contact surface is produced by a section of increased radial dimension on the outside circumference of the hub, this radially enlarged section serves as an axial contact surface for the hub disk, so that, when the weld is made from the opposite side, it is possible to produce an absolutely rigid connection between the hub disk and the hub. Fastened axially in this way to the hub, the hub disk can then be used to limit the axial movement of the piston of the bridge clutch toward the transmission side, which piston can be mounted with freedom of axial movement on a section of the outside circumference of the hub. To this extent the hub disk serves as an axial contact surface for the piston in this direction of motion. In the opposite direction, the piston comes to a stop when a friction lining attached to it or a friction surface provided on it makes contact with an opposing friction surface of any suitable type, which, in turn, is supported axially against the converter cover on the internal combustion engine side. To give the piston this freedom of axial movement without as a result being forced to move the entire torsional vibration damper, including the turbine wheel, it is provided that the cover plates, attached to the piston to serve as the input parts of the torsional vibration damper, are arranged at predetermined axial distances from the hub disk. This axial distance is preferably calculated in such a way that the piston can reach its limit position on the converter cover side or on the hub disk side before the cover plate assigned to this direction of movement is able to make axial contact with the corresponding side of the hub disk and thus hinder or even to prevent such movement.

Because the piston, as already described, has an axial stop on the hub disk, the hub disk must also have support of its own in the direction toward the transmission side, for which reason an axial support is provided on this side, next to the hub disk. Because an axial support of this type should logically be centered, so that it will not cause wear as a result of radial movements during operation, whereas at the same time the hub disk should have an essentially uniform material cross section in its radial dimension, a result which is obtained by the use of flat-surfaced sheets or plates as a starting material, the axial support is centered at a different point, namely, at the hub of the stator of the hydrodynamic torque converter. The side of this stator hub facing away from the hub disk is braced by another axial support against the converter hub on the transmission side. Radially, however, the stator hub is mounted on a hollow support shaft by way of a free-wheel device in the conventional manner, where, with respect to the engineering design of a support shaft of this type, U.S. Pat. No. 5,575,363 discloses ways in which the stator can be held in place radially and ways in which the flow paths for the control of the piston of the bridge clutch can be laid out.

Let us return to the base of the turbine wheel, which is attached by a welding operation to the hub disk. It should be noted that, as a result of the introduction of bent sections, this base shows a high degree of elasticity in the axial direction. Axial vibrations which have been transmitted from the crankshaft via the piston of the bridge clutch, the hub, and the hub disk to the turbine base can thus be effectively reduced before they are transmitted onward to the turbine wheel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE shows the upper half of a section through a hydrodynamic torque converter with bridge clutch and torsional vibration damper.

DETAILED DESCRIPTION OF THE PRESENTLY PREFERRED EMBODIMENTS

The hydrodynamic torque converter shown in the FIGURE has a converter cover 1, in the radially inner area of which a bearing journal 3 is formed, which can, in a manner known in and of itself and therefore not explained in detail here, provide a centering function on the crankshaft side. In the radially outer area of the converter cover 1, furthermore, fastening elements 5 are provided, which, with the help of a flex plate, for example, designed in the usual manner and therefore not shown in the FIGURE, can be used to attach the converter cover 1 to the crankshaft.

The converter cover 1 is attached by a weld 6 to an impeller shell 7, which is drawn radially inward to form a converter hub 8. The impeller shell 7 serves to accept impeller vanes 9 and thus forms an impeller 11, which cooperates with a turbine wheel 17 and with a stator 80 to form a hydrodynamic circuit 12. The turbine wheel 17 has a turbine wheel shell 13 and turbine vanes 15; and, radially inside the turbine vanes 15, it has a turbine base 19, which is designed with a plurality of bent sections 78 to provide high axial rigidity. The turbine base 19 is connected by a weld 21 in the radially central area to a hub disk 23, which in turn is attached in the radially inner area by a weld 25 to a hub 27. The latter has, on its inside diameter, a set of gear teeth, by means of which it is connected to an opposing set of teeth of a transmission input shaft 29 in such a way that it cannot rotate relative to the shaft but can shift axially. The hub 27 has on its outside circumference 31 a radially enlarged section 33, which serves as an axial contact surface 35 for the hub disk 23, mounted on a radially smaller hub section 37. Pushed on from the side of this smaller radial hub section 37, the hub disk 23 is held axially in position at the axial contact surface 35 and can be brought in exactly this position into rigid connection with the hub 27 by the weld 25, which is made from the opposite side.

The radially smaller hub section 37 extends toward the converter cover 1 and carries not only the hub disk 23 but also the piston 40 of a bridge clutch 42, which has a section 39 in the area where the hub disk 23 extends radially, this section projecting axially toward the hub disk. When the bridge clutch 42 is completely open, the piston comes to rest by this axial projection against the side of the hub disk 23 which faces the piston. Thus the hub disk 23 forms an axial stop 44 for the piston 40 and defines the limit position of the piston 40 on the hub disk side. The second limit position is the one on the converter cover side, which the piston 40 assumes when the bridge clutch 42 is closed. In this position, the friction surface 48 of a friction lining 46 attached to the piston 40 has arrived in contact with an opposing friction surface 50 of the converter cover 1. In designs of bridge clutches with several friction linings, as already realized in FIG. 1 of U.S. Pat. No. 5,575,363, the piston is also supported against the converter cover when in its converter cover-side limit position, but not directly. Rather, if desired, it can be supported by additional friction linings and at least one intermediate clutch disk, which carries the linings.

In the middle radial area of the piston 40, an attachment 52 is provided for the cover plates 54, 56; the attachment 52 is designed in the form of a riveted joint. Cover plates 54, 56 are input parts 58 of a torsional vibration damper 60, which also comprises the hub disk 23, as previously explained, as the output part 62. To return to the cover plates 54, 56, these have circumferential openings 64, in which stored-energy elements 68 are held, and at the ends of the stored-energy elements 68, each of the circumferential openings 64 has actuating areas 66 for the stored-energy elements 68. The hub disk 23 is also provided with these types of actuating areas 74 for the stored-energy elements 68, namely, on radial projections 76, which extend axially between the two cover plates 54, 56. Between the piston-side cover plate 54 and the side of the hub disk associated with this plate, a first axial distance 70 is provided, whereas, between the turbine-wheel side cover plate 56 and the corresponding side of the hub disk 23, a second axial distance 72 is provided. As a result of the two above-mentioned axial distances 70, 72, which can be different from each other, a certain relative freedom of axial movement of the cover plates 54, 56 with respect to the hub disk 23 is achieved, where each of the previously mentioned axial distances is defined as a function of the range of the axial movement of the piston between its converter cover-side limit position and its hub disk-side limit position. Thus it is achieved that the piston 40 is free to move between its two above-mentioned limit positions without the need to move the hub disk 23, the hub 27, and especially the turbine wheel 17 along with it at the same time. As a result, the piston 40 has very little inertia and thus can be switched very quickly.

So that the hub disk 23 can perform its function as an axial stop 44 for the piston 40, it must have axial support of its own on the side facing away from the piston 40. For this purpose, an axial support 98 is provided on this side of the hub disk 23, which support is radially centered on a centering surface 96 of a stator hub 82 of the stator 80. In the axial direction, however, the axial support 98 is supported against a free-wheel device 84, enclosed by the stator hub 82, which free-wheel device has, in the conventional manner and therefore not explained in detail, a free-wheel outer ring 86, a free-wheel inner ring 90, and clamping bodies 88 radially between the rings. On the free-wheel inner ring 90, furthermore, a set of teeth is formed in the radially inner area, by means of which this free-wheel inner ring is mounted nonrotatably but with freedom of axial movement on a support shaft 92. Only a segment of a support shaft 92 of this type, which ensures the radial centering of the stator 80, appears in the FIGURE, but it can be clearly seen in FIGS. 1–3 of U.S. Pat. No. 5,575,363.

On the side of the stator hub 82 facing away from the free-wheel 84, the stator hub is braced axially by another axial support 94 on the converter hub 8.

To return to the hub disk 23, this disk is produced preferably by the stamping of a flat-surfaced sheet or plate, as a result of which, first, the smooth surface provided by the sheet or plate is preserved; and, second, because of the stamping operation, a high level of dimensional accuracy is obtained. This dimensional accuracy pertains both to the radial dimensions of the hub disk and to the precise formation and positioning of its radial projections 76 and thus of the actuating areas 74 for the stored-energy elements 68. This dimensional accuracy is necessary so that, during the transmission of torsional vibrations, the stored-energy elements 68 are able to deflect the hub disk 23 in a clearance-free and therefore impact-free manner, and it is also necessary to ensure that the radial projections 76 extend radially outward far enough that their actuating areas 74 can contact the contact points of the stored-energy elements 68 over the entire radial extent of the stored-energy elements 68 but not so far that they intrude radially any farther than absolutely necessary into the space between the two cover plates 54, 56. As a result, the transmission quality between the stored-energy elements 68 and the radial projections 76 of the hub disk 23 is very good, while the least possible amount of material is used for the hub disk and thus the least possible inertia is realized. The previously mentioned dimensional accuracy in the area of the radial projections 76 of the hub disk 23, however, is meaningful only when the radially inner end of the disk has also been stamped out with the same precision to ensure satisfactory seating with optimal centering on the hub 27. Logically, therefore, the surface quality of the hub 27 should fulfill the same high requirements as those imposed on the hub disk 23. The hub 27 is therefore preferably produced by cold forming, especially by cold pressing in the present case, in only a single line of presses or possibly even in only a single press, so that the requirements imposed on surface quality and dimensional accuracy can be fulfilled on the hub side as well. Because of the very compact design of the hub and the small amount of material required to produce it, the hub will also contribute to the overall low-inertia design.

Connecting the base 19 of the turbine to the hub disk 23 makes it possible to omit a separate turbine hub; in addition, the weld 21 eliminates the need for a much more expensive and heavy riveted joint. The radial point at which the turbine base 19 is connected to the hub disk 23 can in this case—unless affected by other design elements such as the stator hub 82 or the axial support 98—be selected with freedom, because the production of the hub disk 23 by stamping from sheets or plates absolutely guarantees an essentially uniform material cross section over the entire radial extent of the hub disk 23. This latter feature also has a positive effect when, as a result of play, small radial movements occur between the piston 40 and the hub disk 23 when the piston is in its limit position on the hub disk-side and between the hub disk and the axial support 98.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torsional vibration damper for a hydrodynamic torque converter, said torsional vibration damper comprising:

an input section comprising a converter cover, an output section comprising a hub disk which is non-rotatably connected to a hub which can be centered on a transmission shaft, said hub having an outside circumference, said hub disk extending radially inward to said hub and being attached directly to said outside circumference of said hub, a turbine wheel having a turbine base, said turbine base being fixed directly to said hub disk, a bridge clutch comprising a piston connected to said hub disk, stored energy elements which permit circumferential movement of said piston relative to said hub disk, and means for bringing said piston into working connection with the converter cover, said means including at least one friction surface.

2. A torsional vibration damper as in claim 1 wherein said hub comprises an axially facing contact surface which contacts said hub disk.

3. A torsional vibration damper as in claim 2 wherein said outside circumference of said hub comprises a section of larger radial dimension and a section of smaller radial dimension separated by said axially facing contact surface, said hub disk being mounted on the section of smaller radial dimension.

4. A torsional vibration damper as in claim 1 wherein said hub disk is welded to said hub.

5. A torsional vibration damper as in claim 1 wherein said hub disk has a thickness which is substantially uniform over the radial extent of said hub disk.

6. A torsional vibration damper as in claim 1 wherein said hub disk is stamped from one of metal sheet and metal plate.

7. A torsional vibration damper as in claim 1 wherein said hub is fabricated by cold forming.

8. A torsional vibration damper as in claim 1 wherein said piston is centered on said outside surface of said hub, said hub disk comprising an axial contact surface which limits the axial movement of the piston.

9. A torsional vibration damper as in claim 1 wherein said piston has a side facing away from said hub disk which is supported solely by said converter cover.

10. A torsional vibration damper as in claim 1 wherein said bridge clutch comprises a pair of cover plates fixed to said piston, said cover plates having circumferential openings in which said stored energy elements are held, said hub disk being accommodated between said cover plates and separated therefrom by predetermined axial distances.

11. A torsional vibration damper as in claim 10 wherein said piston is centered on said outside surface of said hub, said hub disk comprising an axial contact surface which limits the axial movement of the piston, said piston having a side facing away from said hub disk which is supported solely by said converter cover, said hub disk being separated from each of the cover plates by an axial distance which is at least equal to the range of axial movement of the piston between the converter cover and the hub disk.

12. A torsional vibration damper as in claim 1 wherein said turbine base is welded to said hub disk.

13. A torsional vibration damper as in claim 1 wherein said base comprises circumferentially extending bends.

14. A torsional vibration damper as in claim 1 further comprising an axial support for said hub disk, said hydrodynamic torque converter comprising a stator having a stator hub centered on a support shaft by a free-wheel, said stator hub having a centering surface for said axial support.

15. A torsional vibration damper as in claim 14 wherein said hub disk has a surface which contacts said axial support opposite from said piston.

* * * * *